US012756514B2

(12) United States Patent
Xiao et al.

(10) Patent No.: US 12,756,514 B2
(45) Date of Patent: Oct. 6, 2026

(54) FRONTHAUL MESSAGE PROCESSING BASED ON TYPE OF TRANSPORT LAYER, FRONTHAUL INTERFACE, COMMUNICATION DEVICE AND COMPUTER-READABLE STORAGE MEDIUM

(71) Applicant: SANECHIPS TECHNOLOGY CO., LTD., Shenzhen (CN)

(72) Inventors: Lu Xiao, Shenzhen (CN); Jingxin Gao, Shenzhen (CN)

(73) Assignee: SANECHIPS TECHNOLOGY CO., LTD., Shenzhen (CN)

( * ) Notice: Subject to any disclaimer, the term of this patent is extended or adjusted under 35 U.S.C. 154(b) by 312 days.

(21) Appl. No.: 18/684,901

(22) PCT Filed: Mar. 17, 2022

(86) PCT No.: PCT/CN2022/081385
§ 371 (c)(1),
(2) Date: Feb. 20, 2024

(87) PCT Pub. No.: WO2023/024494
PCT Pub. Date: Mar. 2, 2023

(65) Prior Publication Data

US 2024/0430054 A1 Dec. 26, 2024

(30) Foreign Application Priority Data

Aug. 26, 2021 (CN) ........................ 202110987481.X

(51) Int. Cl.
*H04L 5/00* (2006.01)
*H04L 69/06* (2022.01)
(Continued)

(52) U.S. Cl.
CPC ............ *H04L 5/0048* (2013.01); *H04L 69/06* (2013.01); *H04L 69/08* (2013.01); *H04L 69/22* (2013.01); *H04L 69/324* (2013.01)

(58) Field of Classification Search
CPC ....... H04L 5/0048; H04L 69/06; H04L 69/08; H04L 69/22; H04L 69/324; H04W 24/02; H04W 88/085; H04W 28/06; H04W 92/12
See application file for complete search history.

(56) References Cited

U.S. PATENT DOCUMENTS 7,330,902 B1 * 2/2008 Bergenwall ............... H04L 9/40
370/465
10,212,138 B1 2/2019 Diamant et al.
(Continued)

FOREIGN PATENT DOCUMENTS

CN 111565218 A 8/2020
JP 2017092671 A 5/2017
(Continued)

OTHER PUBLICATIONS

Japan Patent Office, the first Office action dated Jan. 7, 2025, for corresponding JP application No. 2024-507032.
(Continued)

*Primary Examiner* — Thai Nguyen
(74) *Attorney, Agent, or Firm* — Li & Cai Intellectual Property (USA) Office

(57) ABSTRACT

The present disclosure provides a fronthaul message processing method, including: determining a type keyword of a fronthaul message according to a type of a transport layer for transmitting the fronthaul message; determining a type of the fronthaul message according to the type keyword; determining a position of service data carried by the fronthaul message according to the type of the fronthaul message; and extracting and processing the service data according to the position of the service data. The present disclosure further provides a fronthaul message processing apparatus, a fronthaul interface, a communication device, and a computer-readable storage medium.

13 Claims, 5 Drawing Sheets

(51) Int. Cl.

| | |
|---|---|
| ***H04L 69/08*** | (2022.01) |
| ***H04L 69/22*** | (2022.01) |
| ***H04L 69/324*** | (2022.01) |

(56) References Cited

U.S. PATENT DOCUMENTS

| | | | | |
|---|---|---|---|---|
| 11,234,163 | B1 * | 1/2022 | Ho | H04W 28/06 |
| 2018/0242349 | A1 * | 8/2018 | Noh | H04W 72/56 |
| 2020/0235905 | A1 | 7/2020 | Su et al. | |
| 2021/0083726 | A1 * | 3/2021 | Wala | H01Q 1/246 |

FOREIGN PATENT DOCUMENTS

| | | | |
|---|---|---|---|
| JP | 2017163250 | A | 9/2017 |
| WO | WO 2013073448 | A1 | 5/2013 |
| WO | WO2021159248 | A1 | 8/2021 |

OTHER PUBLICATIONS

Korean Patent Office, the first Office action dated Feb. 4, 2025, for corresponding KR application No. 10-2024-7003900.

European Patent Office, the extended European Search Report dated Jun. 23, 2025, for corresponding EP application No. 22859849.6.

* cited by examiner

FRONTHAUL MESSAGE PROCESSING BASED ON TYPE OF TRANSPORT LAYER, FRONTHAUL INTERFACE, COMMUNICATION DEVICE AND COMPUTER-READABLE STORAGE MEDIUM

CROSS-REFERENCE TO RELATED APPLICATIONS

The present application is a National Phase Application filed under 35 U.S.C. 371 as a national stage of PCT/CN2022/081385 filed on Mar. 17, 2022, and claims the priority of Chinese Patent Application 202110987481.X, filed on Aug. 26, 2021, the contents of which are incorporated herein in their entirety by reference.

TECHNICAL FIELD

The present disclosure relates to the field of communication technology, and in particular, to a fronthaul message processing method, a fronthaul message processing apparatus for executing the fronthaul message processing method, a fronthaul interface, a communication device, and a computer-readable storage medium.

BACKGROUND

To meet the low latency, high bandwidth, and large data volume requirements of 5G networking scenarios, relevant technologies have evolved the Common Public Radio Interface (CPRI) protocol, serving as a fronthaul interface protocol, into an Ethernet fronthaul protocol, known as 5G fronthaul interface protocol. The 5G fronthaul interface protocol include a Radio over Ethernet (RoE) protocol, an enhanced Common Public Radio Interface (eCPRI) protocol, an open Radio Access Network (oRAN) protocol, x Radio Access Network (xRAN) protocol, and the like. Compared with the CPRI protocol, the Ethernet fronthaul protocol is based on an Ethernet packet encapsulation (e.g., a packet of a type such as MAC, IP, UDP, or the like) and can more flexibly support the requirements of 5G networking scenarios. However, the 5G fronthaul interface protocol may be of various types, and each type needs to be configured with a corresponding logic to support it, leading to a complex design and increased resource consumption.

SUMMARY

In a first aspect, an embodiment of the present disclosure provides a fronthaul message processing method, including: determining a type keyword of a fronthaul message according to a type of a transport layer for transmitting the fronthaul message; determining a type of the fronthaul message according to the type keyword; determining a position of service data carried by the fronthaul message according to the type of the fronthaul message; and extracting and processing the service data according to the position of the service data.

In a second aspect, an embodiment of the present disclosure provides a fronthaul message processing apparatus, including: a type keyword determination module, configured to determine a type keyword of a fronthaul message according to a type of a transport layer for transmitting the fronthaul message; a message type determination module, configured to determine a type of the fronthaul message according to the type keyword; a position determination module, configured to determine a position of service data carried by the fronthaul message according to the type of the fronthaul message; and a service data processing module, configured to extract and process the service data according to the position of the service data.

In a third aspect, an embodiment of the present disclosure provides a fronthaul interface, including: at least one processor; a memory having at least one computer program stored thereon, the at least one computer program, executed by the at least one processor, causes the at least one processor to implement the fronthaul message processing method according to the first aspect of the present disclosure; and at least one input/output (I/O) interface connected between the at least one processor and the memory, configured to enable information interaction between the at least one processor and the memory.

In a fourth aspect, an embodiment of the present disclosure provides a communication device including the fronthaul interface provided by the third aspect of the present disclosure.

In a fifth aspect, an embodiment of the present disclosure provides a computer-readable storage medium, storing a computer program thereon, the computer program executed by a processor, causes the processor to implement the fronthaul message processing method according to the first aspect of the present disclosure.

DESCRIPTION OF EMBODIMENTS

In order to make the person skilled in the art better understand the technical solution of the present disclosure, a fronthaul message processing method, a fronthaul message processing apparatus, a fronthaul interface, a communication device, and a computer-readable storage medium provided in the present disclosure are described in detail below with reference to the accompanying drawings.

The exemplary embodiments of present disclosure will be described in detail below with reference to the accompanying drawings, but may be embodied in different forms and should not be construed as limiting the scope of the present disclosure. These embodiments are provided so that the present disclosure will be thorough and complete, and will enable the person skilled in the art to fully understand the scope of the present disclosure.

The embodiments and features in the embodiments may be combined with each other without any conflict.

As used herein, the term "and/or" includes any and all combinations of at least one associated listed item.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "includes/comprises" and/or "including/comprising" if used in the specification, specify the presence of stated features, integers, steps, operations, elements, and/or components, but do not preclude the presence or addition of at least one other feature, integer, step, operation, element, component, and/or group thereof.

Unless otherwise defined, all terms (including technical and scientific terms) used herein have the same meaning as commonly understood by a person skilled in the art. It will be further understood that terms, such as the terms defined in commonly used dictionary, should be interpreted as having meanings consistent with their meanings in the context of the related art and the present disclosure, and will not be interpreted as having idealized or over formal meanings unless specifically defined herein.

Figure 1:
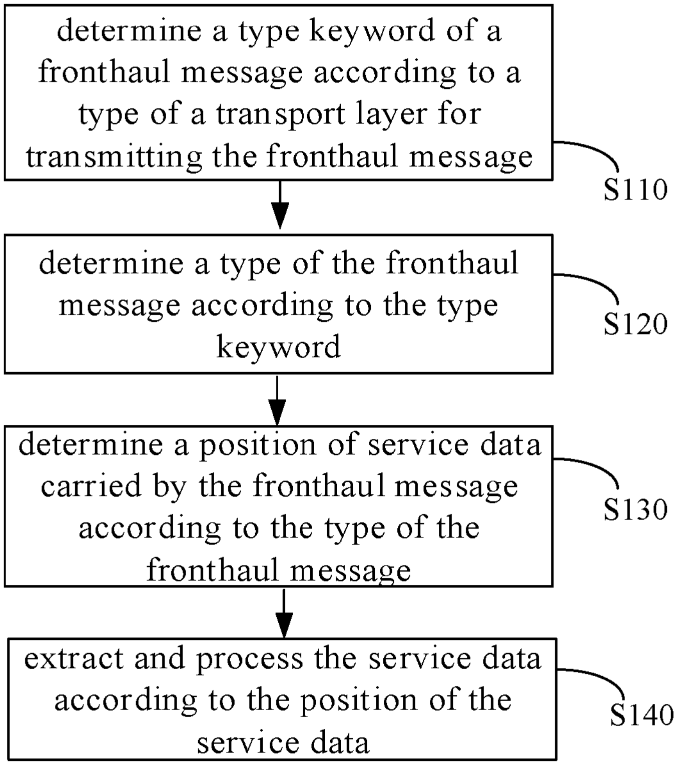
FIG. 1 is a flowchart of a fronthaul message processing method according to an embodiment of the present disclosure.

In a first aspect, an embodiment of the present disclosure provides a fronthaul message processing method, as shown in FIG. 1, the fronthaul message processing method includes following steps S110 to S140.

At step S110, determining a type keyword of a fronthaul message according to a type of a transport layer for transmitting the fronthaul message.

At step S120, determining a type of the fronthaul message according to the type keyword.

At step S130, determining a position of service data carried by the fronthaul message according to the type of the fronthaul message.

At step S140, extracting and processing the service data according to the position of the service data.

The fronthaul message is a message based on an Ethernet fronthaul protocol, and the Ethernet fronthaul protocol is based on an Ethernet protocol. The type of the fronthaul message is the type of the Ethernet fronthaul protocol for encapsulating the fronthaul message. For example, the type of the fronthaul message may be one of multiple types, such as MAC message, IPV4 message, and IPV6 message. In the present disclosure, a field associated with a message type and a transport layer for transmitting the fronthaul message may be determined as the type keyword. For transmitting fronthaul messages in a same transport layer, different types of fronthaul messages carry different type keywords.

For example, if the transport layer is the MAC layer, the ETHtype field of the fronthaul message may be determined as the type keyword of the fronthaul message. For the fronthaul message of a type of IPV4, the ETHtype field is 0x0800; for the fronthaul message of a type of IPV6, the ETHtype field is 0x86DD; for the fronthaul message of a type of eCPRI, the ETHtype field is 0xAEFF.

For another example, if the transport layer is the IPV4 layer, the Protocol field of the fronthaul message may be determined as the type keyword of the fronthaul message. The type of the fronthaul message may be determined by identifying the Protocol field of the fronthaul message.

After determining the type of the fronthaul message, the structure of the fronthaul message can be determined, and based on the structure of the fronthaul message, the position of service data in the fronthaul message can be determined, so that the service data can be extracted.

The fronthaul message processing method is applied to a fronthaul interface of a receiving end of the fronthaul message, by determining the type of the transport layer for transmitting the fronthaul message, the specific type of the fronthaul message can be determined, in other words, for different types of fronthaul messages sent by different transmitting ends, the fronthaul interface of the receiving end can extract service data from all received fronthaul messages, which achieves a compatibility between different types of Ethernet fronthaul protocols at the receiving end, so that there is no need to configure corresponding logics for each protocol at the fronthaul interface of the receiving end, thereby simplifying the structure of the fronthaul interface for receiving and processing different types of fronthaul messages, and resulting in a reduced implementation cost.

It should be noted that "service data" as used herein refers to data of in an information field (i.e., payload) of the fronthaul message.

In the present disclosure, the specific implementation of the step (i.e., step S130) of determining the position of service data carried by the fronthaul message according to the type of the fronthaul message is not specifically limited. For example, the position of the service data may be directly calculated according to the type of the fronthaul message.

Figure 2:
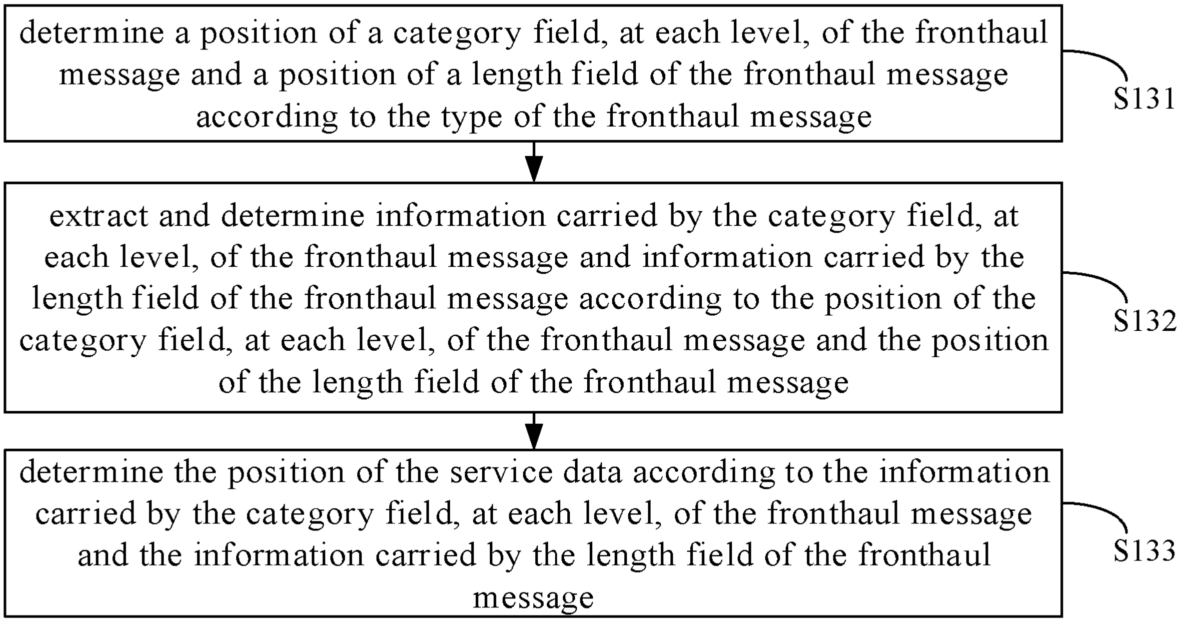
FIG. 2 is a flowchart of an implementation of step S130.

For convenience of implementation, in some implementations, as shown in FIG. 2, the step S130 may include following steps S131 to S133.

At step S131, determining a position of a category field, at each level, of the fronthaul message and a position of a length field of the fronthaul message according to the type of the fronthaul message.

At step S132, extracting and determining information carried by the category field, at each level, of the fronthaul message and information carried by the length field of the fronthaul message according to the position of the category field, at each level, of the fronthaul message and the position of the length field of the fronthaul message.

At step S133, determining the position of the service data according to the information carried by the category field, at each level, of the fronthaul message and the information carried by the length field of the fronthaul message.

Figure 3:
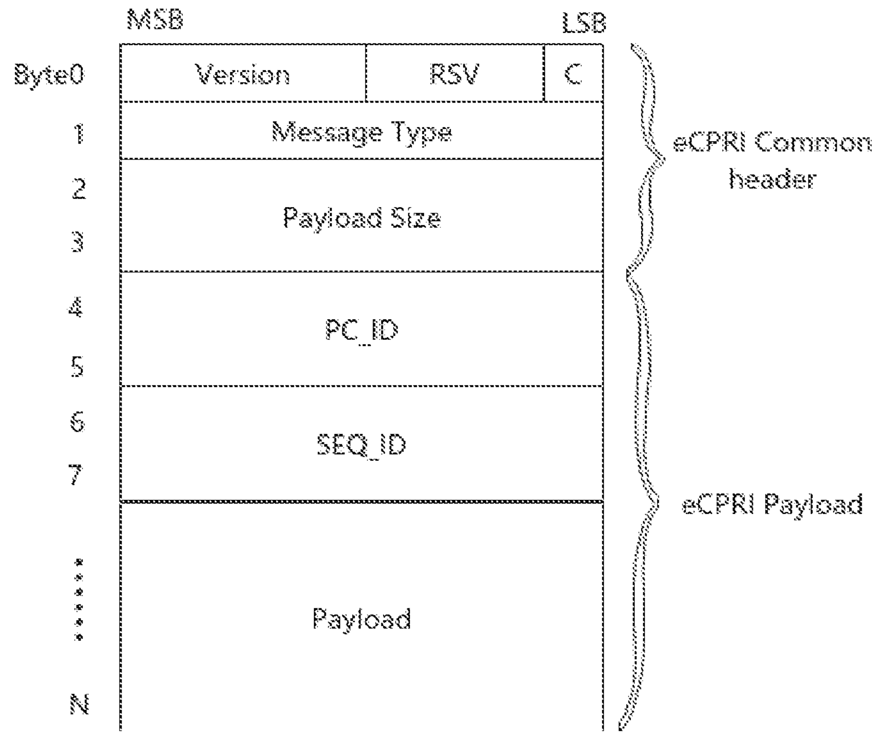
FIG. 3 is a schematic diagram of a data structure of a fronthaul message based on eCPRI protocol.
Figure 4:
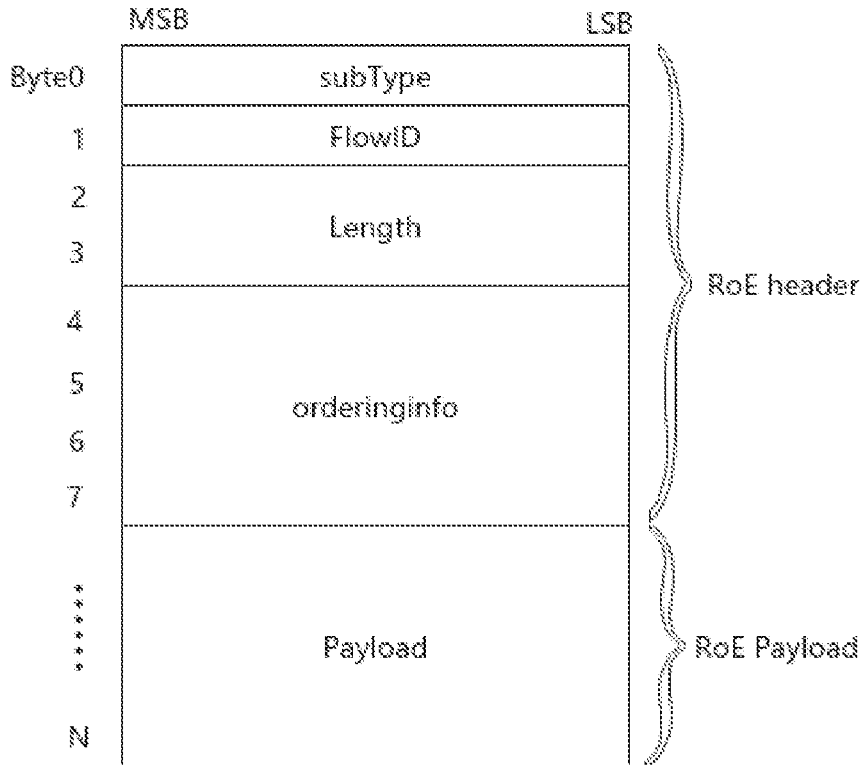
FIG. 4 is a schematic diagram of a data structure of a fronthaul message based on RoE protocol.

For different types of fronthaul messages, although positions of category fields are different, data described by the category fields at a same level belong to a same type of data flow. By determining the data corresponding to the category fields, the method for processing the service data can be determined. The fronthaul message may include at least one level of category field. For example, for the fronthaul message based on the eCPRI protocol, the data carried by the fronthaul message are in categories at two levels. As shown in FIG. 3, the data of the fronthaul message based on the eCPRI protocol includes a data flow represented by a first-level (i.e., top) category field Message Type and a data flow represented by a second-level (i.e., sub) category field PC_ID. For another example, the data carried by the fronthaul message based on the RoE protocol also are in categories at two levels. As shown in FIG. 4, the data of the fronthaul message based on the RoE protocol includes a data flow represented by a first-level category field subType and a data flow represented by a second-level category field FlowID. For the fronthaul message based on the eCPRI protocol and the fronthaul message based on the RoE protocol, the data flow represented by the first-level category field Message Type and the data flow represented by the first-level category field subType include the same type of data, and the data flow represented by the second-level category field PC_ID and the data flow represented by the second-level category field FlowID include the same type of data. In the present disclosure, the position of the category field at each level may be determined according to the type of the fronthaul message.

As described above, for each type of fronthaul message, the position of the length field is constant. In other words, the position of the length field of the fronthaul message is only related to the message type of the fronthaul message. Once the message type of the fronthaul message is determined, the position of the length field of the fronthaul message is determined. In the fronthaul message, the length field may directly or indirectly reflect the length of the service data.

For example, for the fronthaul message based on the eCPRI protocol, the Payload Size field (i.e., the length field) includes a PC_ID field, a SEQ_ID field (i.e., a sequence field), and a total length of service data. The length of the service data may be determined according to the value of the Message Type. Specifically, in a case where the value of the Message Type is any one of 0, 1, or 2, the length of the service data is the value of the Payload size field minus 4. In a case where the value of the Message Type is 3, the length of the service data is the value of the Payload size field minus 8. The relationship between the value of the Payload Size field and the length of the service data is specified in the eCPRI protocol and will not be described here.

For another example, for the fronthaul message based on the RoE protocol, the length field Length contains a length of service data located after the orderinginfo field.

As shown in FIG. 3, the fronthaul message based on the eCPRI protocol includes two parts, i.e., eCPRI Common header and eCPRI Payload, the eCPRI Common header carries version field Version, RSV field, C field, Message Type, and Payload Size field, and the eCPRI Payload carries PC_ID field, SEQ_ID field, and Payload.

As shown in FIG. 4, the fronthaul message based on the RoE protocol includes two parts, i.e., RoE header and RoE Payload, the RoE header carries sub Type field, FlowID field, Length, and orderinginfo field, and the RoE Payload carries Payload.

Table 1 shows a comparison relationship between protocol fields of the fronthaul message based on the eCPRI protocol and protocol fields of the fronthaul message based on the RoE protocol.

TABLE 1

| | eCPRI protocol | | RoE protocol | |
|---|---|---|---|---|
| category | Name | Position | Name | Position |
| version field | Version et al | byte 0 | none | none |
| First-level category | Message Type | byte 1 | SubType | byte 0 |
| length field | Payload Size | byte 2-3 | Length | byte 2-3 |
| Second-level category | PC_ID | byte 4-5 | FlowID | byte 1 |
| Sequence field | SEQ_ID | byte 6-7 | orderinginfo | byte 4-7 |

It should be noted that, although the present disclosure has been described by taking fronthaul messages based on the eCPRI protocol and the RoE protocol as examples, the present disclosure is not limited thereto, and the method provided by the present disclosure may also be applied to fronthaul messages based on other protocols (such as oRAN protocol).

After the position of the category field, at each level, of the fronthaul message and the position of the length field of the fronthaul message are determined, the position of the service data may be determined according to the information carried by the category field at each level and the information carried by the length field of the fronthaul message, and then the service data can be processed.

Figure 5:
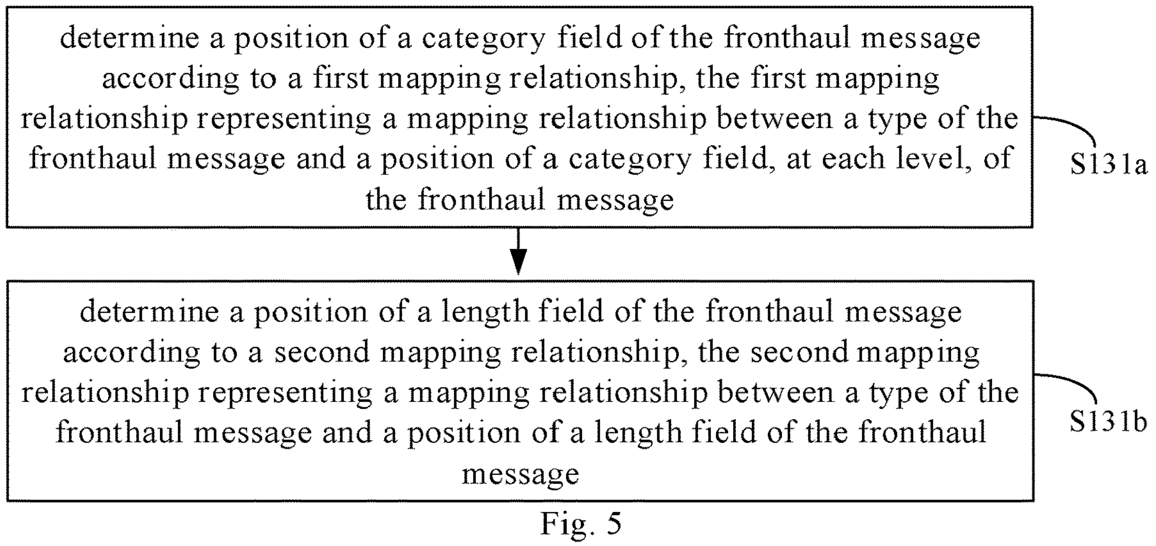
FIG. 5 is a flowchart of an implementation of step S131.

In the present disclosure, how to determine the position of the category field, at each level, of the fronthaul message is not particularly limited. In order to quickly determine the position of the category field, at each level, of the fronthaul message and the position of the length field of the fronthaul message, a first mapping relationship between the message type of the fronthaul message and the position of the category field at each level, and a second mapping relationship between the message type of the fronthaul message and the position of the length field may be stored in advance at the receiving end of the fronthaul message. Accordingly, as shown in FIG. 5, the step S131 may include following steps S131*a* and S131*b*.

At step S131*a*, determining the position of the category field of the fronthaul message according to a first mapping relationship, the first mapping relationship representing a mapping relationship between the type of the fronthaul message and the position of the category field, at each level, of the fronthaul message.

At step S131*b*, determining the position of the length field of the fronthaul message according to a second mapping relationship, the second mapping relationship representing a mapping relationship between the type of the fronthaul message and the position of the length field of the fronthaul message.

Figure 6:
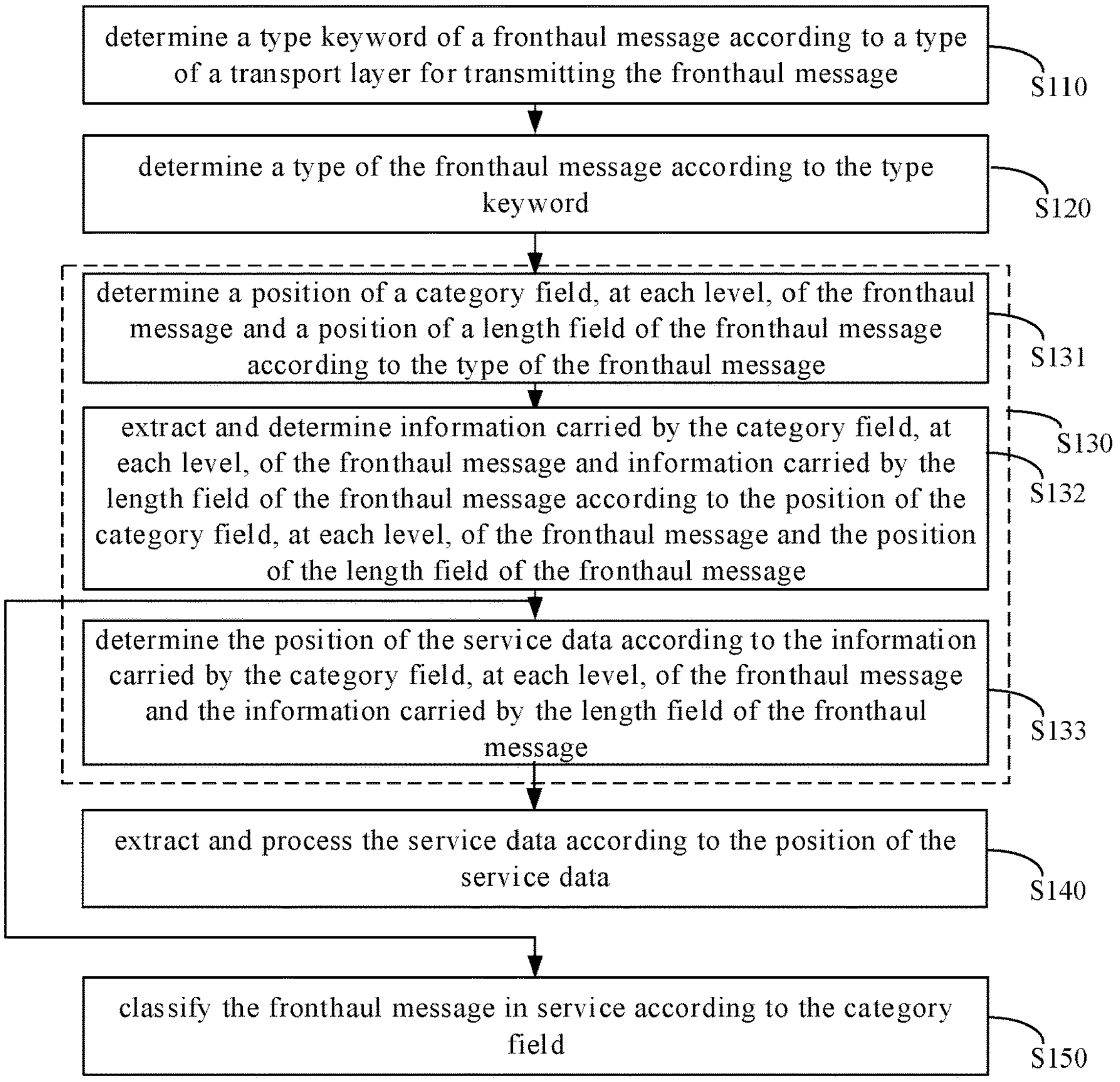
FIG. 6 is a flowchart of a fronthaul message processing method according to an embodiment of the present disclosure.

In addition to determining the position of the service data of the fronthaul message, the category field is also available to classify the fronthaul message containing the category field in service. Correspondingly, as shown in FIG. 6, the fronthaul message processing method may further include a following step S150.

At step S150, classifying the fronthaul message in service according to the category field.

Fronthaul messages classified in different service types are used to implement different services.

Figure 7:
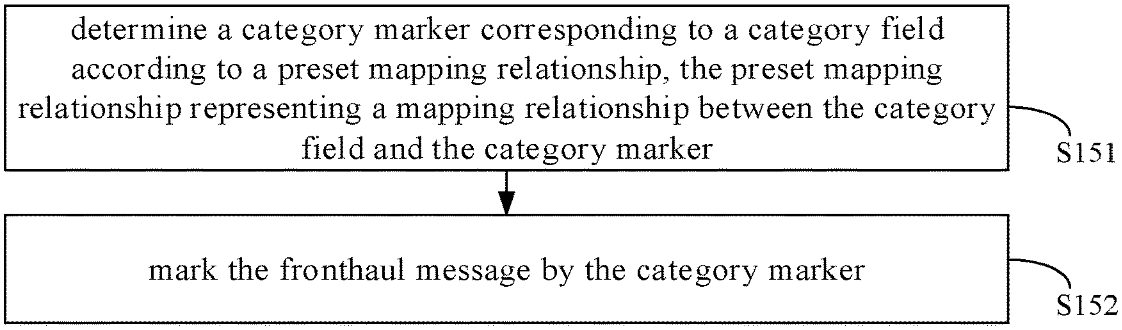
FIG. 7 is a flowchart of an implementation of step S150.

In order to facilitate an identification of the service type of the fronthaul message in the subsequent process of processing the fronthaul message, in some implementations, as shown in FIG. 7, the step S150 may include following steps S151 and S152.

At step S151, determining a category marker corresponding to the category field according to a preset mapping relationship, the preset mapping relationship representing a mapping relationship between the category field and the category marker.

At step S152, marking the fronthaul message by the category marker.

In the present disclosure, Redefine ID may be used to mark the fronthaul message, and values of the Redefine ID are different for different service types.

Figure 8:
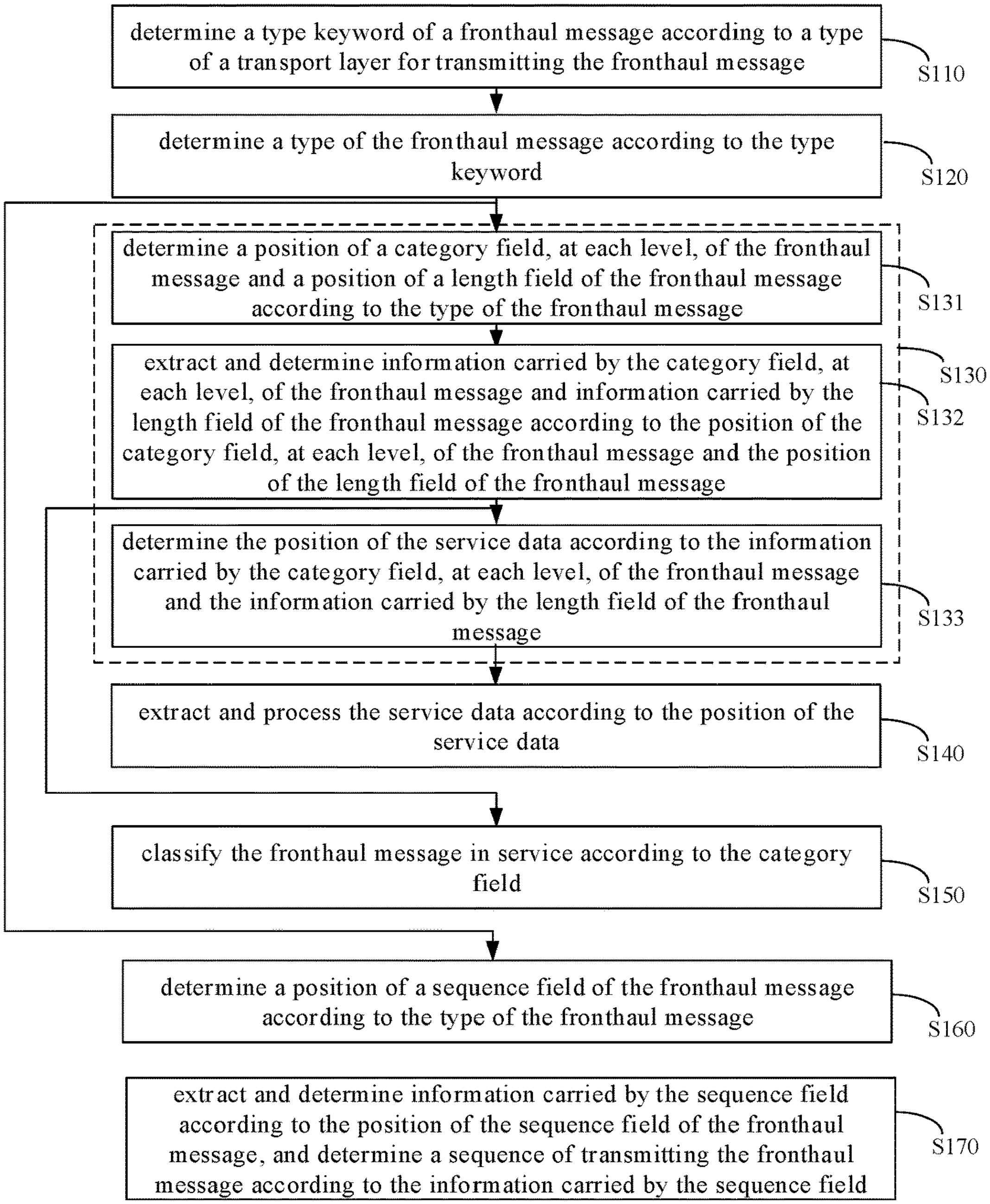
FIG. 8 is a flowchart of a fronthaul message processing method according to an embodiment of the present disclosure.

In order to recover service information carried by the service data of multiple fronthaul messages, in addition to processing the service of the fronthaul message currently received, a sequence of the fronthaul message currently received in multiple fronthaul messages periodically transmitted is further desired to be determined. Accordingly, as shown in FIG. 8, the fronthaul message processing method may further include following steps S160 and S170.

At step S160, determining a position of a sequence field of the fronthaul message according to the type of the fronthaul message.

At step S170, extracting and determining information carried by the sequence field according to the position of the sequence field of the fronthaul message, and determining a sequence of transmitting the fronthaul message according to the information carried by the sequence field.

For a communication device corresponding to the fronthaul interface of the receiving end, after receiving a plurality of fronthaul messages encapsulated, the service data of each fronthaul message is extracted, and then the service data is successively recovered to obtain corresponding service information.

For the fronthaul message based on the eCPRI protocol, the sequence field is SEQ_ID; for the fronthaul message based on the RoE protocol, the sequence field is ordering-info.

The sequence field has two forms including a first form and a second form, the first form is a timing identification associated with a time scale in a certain time period (e.g., 10 ms), the second form is a packet number incrementing within a certain time period (e.g., 10 ms). The message at the fronthaul interface is transmitted according to a certain time period, so that the above two forms may be converted into each other according to a specific conversion formula as follows: a sequence number of a packet*a period for transmitting packets=a timing scale of the packet.

In the present disclosure, the sequence of the fronthaul message currently received may be calculated according to specific information of the sequence field.

Figure 9:
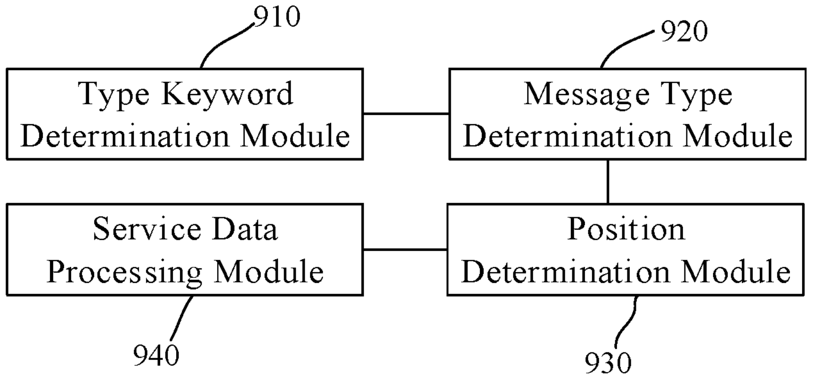
FIG. 9 is a schematic block diagram of a fronthaul message processing apparatus according to an embodiment of the present disclosure.

In a second aspect, an embodiment of the present disclosure provides a fronthaul message processing apparatus, and as shown in FIG. 9, the fronthaul message processing apparatus includes a type keyword determination module 910, a message type determination module 920, a position determination module 930 and a service data processing module 940.

The type keyword determination module 910 is configured to determine a type keyword of a fronthaul message according to a type of a transport layer for transmitting the fronthaul message.

The message type determination module 920 is configured to determine a type of the fronthaul message according to the type keyword.

The position determination module 930 is configured to determine a position of service data carried by the fronthaul message according to the type of the fronthaul message.

The service data processing module 940 is configured to extract and process the service data according to the position of the service data.

The fronthaul message processing apparatus is configured to execute the fronthaul message processing method provided in the first aspect of the present disclosure, and the specific working principle and beneficial effects of the fronthaul message processing method have been described in detail above, and thus are not described repeatedly here.

Figure 10:
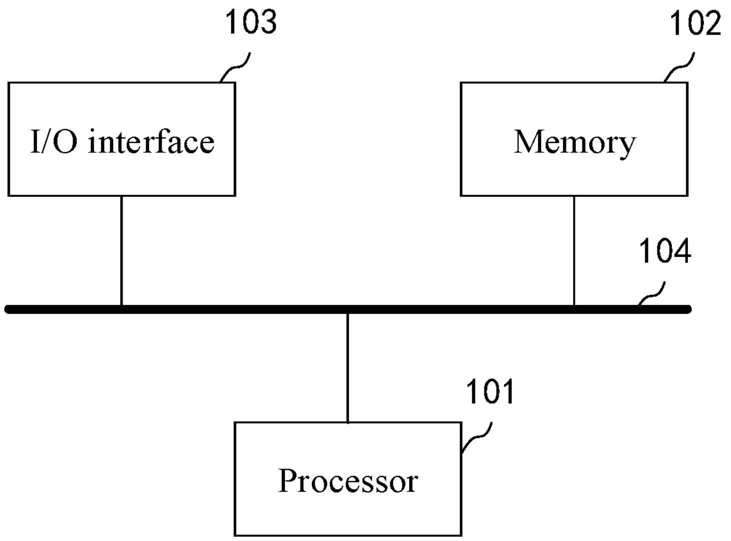
FIG. 10 is a schematic block diagram of a fronthaul interface according to an embodiment of the present disclosure.

In a third aspect, an embodiment of the present disclosure provides a fronthaul interface, as shown in FIG. 10, including: at least one processor 101; a memory 102 having at least one computer program stored thereon, the at least one computer program, executed by the at least one processor 101, causes the at least one processor 101 to implement the fronthaul message processing method according to the first aspect of the present disclosure; and at least one input/output (I/O) interface 103 connected between the at least one processor 101 and the memory 102 and configured to enable information interaction between the at least one processor 101 and the memory 102.

The processor 101 is a device having data processing capabilities, including, but not limited to, a Central Processing Unit (CPU), etc.; the memory 102 is a device having data storage capabilities, including, but not limited to, random access memory (RAM, more specifically SDRAM, DDR, etc.), Read Only Memory (ROM), Electrically Erasable Programmable Read Only Memory (EEPROM), FLASH memory (FLASH); the I/O interface (i.e., a read/write interface) 103 is connected between the processor 101 and the memory 102, can implement information interaction between the processor 101 and the memory 102, and includes, but is not limited to, a data Bus and the like.

In some implementations, the processor 101, memory 102, and I/O interface 103 are interconnected via a bus 104, and then are connected with other components of a computing device.

In a fourth aspect, an embodiment of the present disclosure provides a communication device including the fronthaul interface provided by the third aspect of the present disclosure.

In some implementations, the communication device is one of a baseband processing unit, BBU, an active antenna processing unit, AAU, or a remote radio unit, RRU.

In some implementations, the BBU, the AAU, and the RRU each are provided with the aforementioned fronthaul interface. Thus, if any one of the BBU, the AAU, and the RRU is used as the receiving end, the fronthaul message may be processed according to the fronthaul message processing method provided in the first aspect of the present disclosure.

Figure 11:
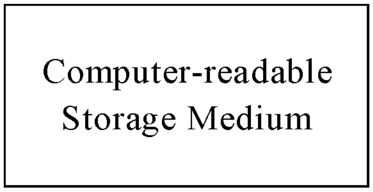
FIG. 11 is a schematic diagram of a computer-readable storage medium according to the present disclosure.

In a fifth aspect, an embodiment of the present disclosure, as shown in FIG. 11, provides a computer-readable storage medium, having a computer program stored thereon, and the computer program, executed by a processor, causes the processor to implement the fronthaul message processing method provided by the first aspect of the present disclosure.

The person skilled in the art will appreciate that all or some operations of the method described above, functional modules/units in the system and apparatus may be implemented as software, firmware, hardware, and suitable combinations thereof. In a hardware implementation, the division between the functional modules/units mentioned in the above description does not necessarily correspond to the division of physical components; for example, one physical component may have multiple functions, or one function or operation may be performed cooperatively by several physical components. Some or all physical components may be implemented as software executed by a processor, such as a CPU, a digital signal processor or microprocessor, or implemented as hardware, or implemented as an integrated circuit, such as an application specific integrated circuit. Such software may be distributed on a computer-readable storage medium which may include a computer storage medium (or non-transitory medium) or a communication medium (or transitory medium). As is well known to those of ordinary skill in the art, the term computer storage medium includes volatile and nonvolatile, removable and non-removable medium implemented in any method or technology for storing information, such as computer-readable instructions, data structures, program modules or other data. The computer storage medium includes, but is not limited to, RAM, ROM, EEPROM, flash memory or other memory technology, CD-ROM, digital versatile disc (DVD) or other optical disc storage, magnetic cartridge, magnetic tape, magnetic disk storage or other magnetic storage devices, or may be any other medium used for storing the desired information and accessible by a computer. Moreover, it is well known to those ordinary skilled in the art that the communication medium typically includes a computer-readable instruction, a data structure, a program module, or other data in a modulated data signal, such as a carrier wave or other transport mechanism, and may include any information delivery medium.

The present disclosure has disclosed example embodiments, and although specific terms are employed, they are used and should be interpreted merely in a generic and descriptive sense, not for purposes of limitation. In some instances, as would be apparent to one skilled in the art, features, characteristics and/or elements described in connection with a particular embodiment may be used alone or in combination with features, characteristics and/or elements described in connection with another embodiment, unless expressly stated otherwise. It will, therefore, be understood by those skilled in the art that various changes in form and details may be made without departing from the scope of the present disclosure as set forth in the appended claims.

The invention claimed is:

1. A fronthaul message processing method, comprising:

determining a type keyword of a fronthaul message according to a type of a transport layer for transmitting the fronthaul message;

determining a type of the fronthaul message according to the type keyword;

determining a position of service data carried by the fronthaul message according to the type of the fronthaul message; and extracting and processing the service data according to the position of the service data, wherein in response to the type of the transport layer for transmitting the fronthaul message indicating that the transport layer is a MAC layer, during determining the type keyword of the fronthaul message according to the type of the transport layer for transmitting the fronthaul message, an ETHtype field of the fronthaul message is determined as the type keyword of the fronthaul message;

in response to the type of the transport layer for transmitting the fronthaul message indicating that the transport layer is an IPV4 layer, during determining the type keyword of the fronthaul message according to the type of the transport layer for transmitting the fronthaul message, a Protocol field of the fronthaul message is determined as the type keyword of the fronthaul message.

2. The method of claim 1, wherein the determining a position of service data carried by the fronthaul message according to the type of the fronthaul message, comprises:

determining a position of a category field, at each level, of the fronthaul message and a position of length field of the fronthaul message according to the type of the fronthaul message;

extracting and determining information carried by the category field, at each level, of the fronthaul message and information carried by the length field of the fronthaul message according to the position of the category field, at each level, of the fronthaul message and the position of the length field of the fronthaul message; and determining the position of the service data according to the information carried by the category field, at each level, of the fronthaul message and the information carried by the length field of the fronthaul message.

3. The method of claim 2, further comprising:

classifying the fronthaul message in service according to the category field.

4. The method of claim 3, wherein the classifying the fronthaul message in service according to the category field, comprises:

determining a category marker corresponding to the category field according to a preset mapping relationship, where the preset mapping relationship representing a mapping relationship between the category field and the category marker; and marking the fronthaul message by the category marker.

5. The method of claim 4, further comprising:

determining a position of a sequence field of the fronthaul message according to the type of the fronthaul message; and extracting and determining information carried by the sequence field according to the position of the sequence field of the fronthaul message, and determining a sequence of transmitting the fronthaul message according to the information carried by the sequence field.

6. The method of claim 3, further comprising:

determining a position of a sequence field of the fronthaul message according to the type of the fronthaul message; and extracting and determining information carried by the sequence field according to the position of the sequence field of the fronthaul message, and determining a sequence of transmitting the fronthaul message according to the information carried by the sequence field.

7. The method of claim 2, further comprising:

determining a position of a sequence field of the fronthaul message according to the type of the fronthaul message; and extracting and determining information carried by the sequence field according to the position of the sequence field of the fronthaul message, and determining a sequence of transmitting the fronthaul message according to the information carried by the sequence field.

8. The method of claim 1, further comprising:

determining a position of a sequence field of the fronthaul message according to the type of the fronthaul message; and extracting and determining information carried by the sequence field according to the position of the sequence field of the fronthaul message, and determining a sequence of transmitting the fronthaul message according to the information carried by the sequence field.

9. A non-transitory computer-readable storage medium, having a computer program stored thereon, and the computer program, executed by a processor, causes the processor to implement the fronthaul message processing method according to claim 1.

10. A fronthaul message processing apparatus, comprising:

a type keyword determination module, configured to determine a type keyword of a fronthaul message according to a type of a transport layer for transmitting the fronthaul message;

a message type determination module, configured to determine a type of the fronthaul message according to the type keyword;

a position determination module, configured to determine a position of service data carried by the fronthaul message according to the type of the fronthaul message; and a service data processing module, configured to extract and process the service data according to the position of the service data, wherein in response to the type of the transport layer for transmitting the fronthaul message indicating that the transport layer is a MAC layer, the type keyword determination module is configured to determine an ETHtype field of the fronthaul message as the type keyword of the fronthaul message;

in response to the type of the transport layer for transmitting the fronthaul message indicating that the transport layer is an IPV4 layer, the type keyword determination module is configured to determine a Protocol field of the fronthaul message as the type keyword of the fronthaul message.

11. A fronthaul interface, comprising:

at least one processor;

a memory having at least one computer program stored thereon, the at least one computer program, executed by the at least one processor, causes the at least one processor to implement the fronthaul message processing method according to claim 1; and at least one input/output (I/O) interface connected between the at least one processor and the memory and configured to enable information interaction between the at least one processor and the memory.

12. A communication device comprising the fronthaul interface of claim 11.

13. A fronthaul message processing method, comprising:

determining a type keyword of a fronthaul message according to a type of a transport layer for transmitting the fronthaul message;

determining a type of the fronthaul message according to the type keyword;

determining a position of service data carried by the fronthaul message according to the type of the fronthaul message; and extracting and processing the service data according to the position of the service data, wherein the determining a position of service data carried by the fronthaul message according to the type of the fronthaul message, comprises:

determining a position of a category field, at each level, of the fronthaul message and a position of length field of the fronthaul message according to the type of the fronthaul message;

extracting and determining information carried by the category field, at each level, of the fronthaul message and information carried by the length field of the fronthaul message according to the position of the category field, at each level, of the fronthaul message and the position of the length field of the fronthaul message; and determining the position of the service data according to the information carried by the category field, at each level, of the fronthaul message and the information carried by the length field of the fronthaul message.

* * * * *